(12) United States Patent
Finger

(10) Patent No.: US 6,181,106 B1
(45) Date of Patent: Jan. 30, 2001

(54) SEQUENTIAL HIGH-RATE CHARGING OF BATTERY CELLS

(75) Inventor: Eugene P. Finger, Brewster, NY (US)

(73) Assignee: Curtis Instruments, Inc., Mt. Kisco, NY (US)

( * ) Notice: Under 35 U.S.C. 154(b), the term of this patent shall be extended for 0 days.

(21) Appl. No.: 09/230,234

(22) PCT Filed: Jul. 17, 1997

(86) PCT No.: PCT/US97/12527

§ 371 Date: Sep. 27, 1999

§ 102(e) Date: Sep. 27, 1999

(87) PCT Pub. No.: WO98/04025

PCT Pub. Date: Jan. 29, 1998

Related U.S. Application Data (60) Provisional application No. 60/021,984, filed on Jul. 18, 1996.

(51) Int. Cl.[7] .................................. H02J 7/00; H02J 7/04
(52) U.S. Cl. .......................... 320/124; 320/120; 320/119; 320/150; 340/636
(58) Field of Search ........................................ 320/119, 120, 320/124, 150; 340/636

(56) References Cited

U.S. PATENT DOCUMENTS

| | | | |
|---|---|---|---|
| 3,928,791 | * | 12/1975 | Mullersman .......................... 320/119 |
| 3,930,192 | * | 12/1975 | Dinkler ................................ 320/119 |
| 4,616,170 | * | 10/1986 | Urstoger .............................. 320/119 |
| 5,623,197 | * | 4/1997 | Roseman et al. ..................... 320/134 |

* cited by examiner

Primary Examiner—Peter S. Wong
Assistant Examiner—Gregory J. Toatley, Jr.
(74) Attorney, Agent, or Firm—John H. Crozier (57) ABSTRACT

In a preferred embodiment, a sequential high-rate battery charger for charging a battery having a plurality of cell units, the battery charger including a current source; an apparatus to selectively sequentially connect each of the plurality of cell units to the high current source; and an apparatus to sequentially provide high current from the high current source to each of the plurality of cell units for a first selected period of time.

28 Claims, 4 Drawing Sheets

SEQUENTIAL HIGH-RATE CHARGING OF BATTERY CELLS

CROSS-REFERENCE TO RELATED APPLICATIONS

The present application claims priority of International Patent Application No. PCT/US97/12527, filed Jul. 17, 1997, and claims benefit of the filing date of U.S. Provisional Application Ser. No. 60/021,984, filed Jul. 18, 1996.

TECHNICAL FIELD

The present invention relates to battery charging generally and, more particularly, but not by way of limitation, to novel means and method for sequentially charging battery cells or cell banks using a high rate of current.

BACKGROUND ART

The rapid charging of batteries, and in particular lead-acid batteries, has been pursued for decades. Procedures for rapid charging of batteries have been reported over the past 20 years or so, mainly for Ni—Cd batteries and, to a lesser extent, for lead-acid batteries. Interest in the latter has increased lately because of intensified interest in electric street vehicles.

All properly designed batteries contain more active material in their plates than their ratings would indicate. In spite of this, most secondary (rechargeable) batteries, especially lead-acid batteries, are routinely used to only about 80 percent of their ratings. Even though only about 80 percent of rated capacity is extracted, the cycle life and lifetime energy throughput is significantly reduced from that of shallower discharges. The cycle life and lifetime energy throughput at 100 percent depth-of-discharge is typically very low.

Conventional charging techniques coupled with rigorous standard discharge conditions often yield a significant amount of cycle-to-cycle capacity variation. Furthermore, grain structure of the active plate material becomes worse and worse with each charging cycle.

A significant amount of research has recently focused on high-rate charging, primarily for rapid recharge (usually partial recharge) for extended range or emergency conditions in street electric vehicles. Until recently, battery charging designers followed the "ampere-hour rule" which holds that the rate of recharge current at any point in the charging cycle should equal the number of ampere hours to be recharged. In spite of this "rule," remarkable side benefits have emerged from studies of high-rate charging—that is, charging rates greatly in excess of that prescribed by the "ampere-hour rule." It appears from the results of these studies that high-rate charging permits greater utilization of active plate material which allows greater depths-of-discharge without detrimental effects and, in fact, is often accompanied by significantly greater cycle life and lifetime energy throughput.

Preliminary physical analyses of high-rate charging effects show: (1) improved maintenance of optimum crystal size within the plate structure, (2) better penetration or use of depth into the third dimension of active plate material, (3) increased electrolyte stirring and convection within local regions and throughout the plate and electrolyte reservoir channels, and (4) enhanced nucleation for crystal formation in deficient plate regions.

Conventional high-rate charging has an objective charging a battery in a small fraction of the time required for conventional charging, through the application of a high rate of current in parallel to all battery cells or cell blocks. Accordingly, a primary drawback of conventional high-rate charging is the extremely high power inputs required. For example, a charger might require 5 kilowatts (220 VAC@23 amperes) during the early part of the charging cycle for conventional charging, but could easily require 50 to 100 kilowatts (440 VAC@113 to 228 amperes) for high-rate charging. Another problem with conventional high-rate charging techniques, which affects battery life, is the inevitable polarization and its concomitant voltage gradients and overvoltages, which usually requires periodic equalization between cells or cell banks. Ideally, some form of equalization should occur during each recharge, but this is usually impractical. Further problems with conventional high-rate charging are a high rate of temperature increase and the possibility of dangerous pressure increase.

Accordingly, it is a principal object of the present invention to provide means and method for high-rate charging that do not necessarily require exceeding the maximum power requirements of conventional (i.e., not high-rate) charging methods.

It is a further object of the invention to provide such means and method that can permit complete charging in less time than conventional charging techniques.

It is an additional object of the invention to provide such means and method that permit utilization of a greater percentage of rated battery capacity, ideally 100 percent of a well designed battery.

It is another object of the invention to provide such means and method that increase cycle life and lifetime energy throughput, to perhaps a doubling or tripling of cycle life and lifetime energy throughput.

A further object of the invention is to provide such means and method which performs equalization (cell-by-cell or block-by-block) during each recharge.

An additional object of the invention is to provide such means and method that improve overall charge coulombic efficiency from, say, 90 percent for conventional charging to greater than 95 percent.

Another object of the invention is to provide such means and method that optimize and synchronize the battery state-of-charge computer employed.

Yet a further object of the invention is to provide such means and method that provide alerts concerning abnormalities, especially equalization imbalance.

Other objects of the present invention, as well as particular features, elements, and advantages thereof, will be elucidated in, or be apparent from, the following description and the accompanying drawing figures.

DISCLOSURE OF INVENTION

The present invention achieves the above objects, among others, by providing, in a preferred embodiment, a sequential high-rate battery charger for charging a battery having a plurality of cell units, said battery charger comprising: a high current source; means to selectively sequentially connect each of said plurality of cell units to said high current source; and means to sequentially provide high current from said high current source to said each of said plurality of cell units for a first selected period of time.

BRIEF DESCRIPTION OF DRAWINGS

Understanding of the present invention and the various aspects thereof will be facilitated by reference to the accompanying drawing figures, submitted for purposes of illustration only and not intended to define the scope of the invention, on which.

BEST MODE FOR CARRYING OUT THE INVENTION

Reference should now be made to the drawing figures, on which similar or identical elements are given consistent identifying numerals throughout the various figures, and on which parenthetical references to figure numbers direct the reader to the view(s) on which the element(s) being described is (are) best seen, although the element(s) may be seen also on other views.

Figure 1:
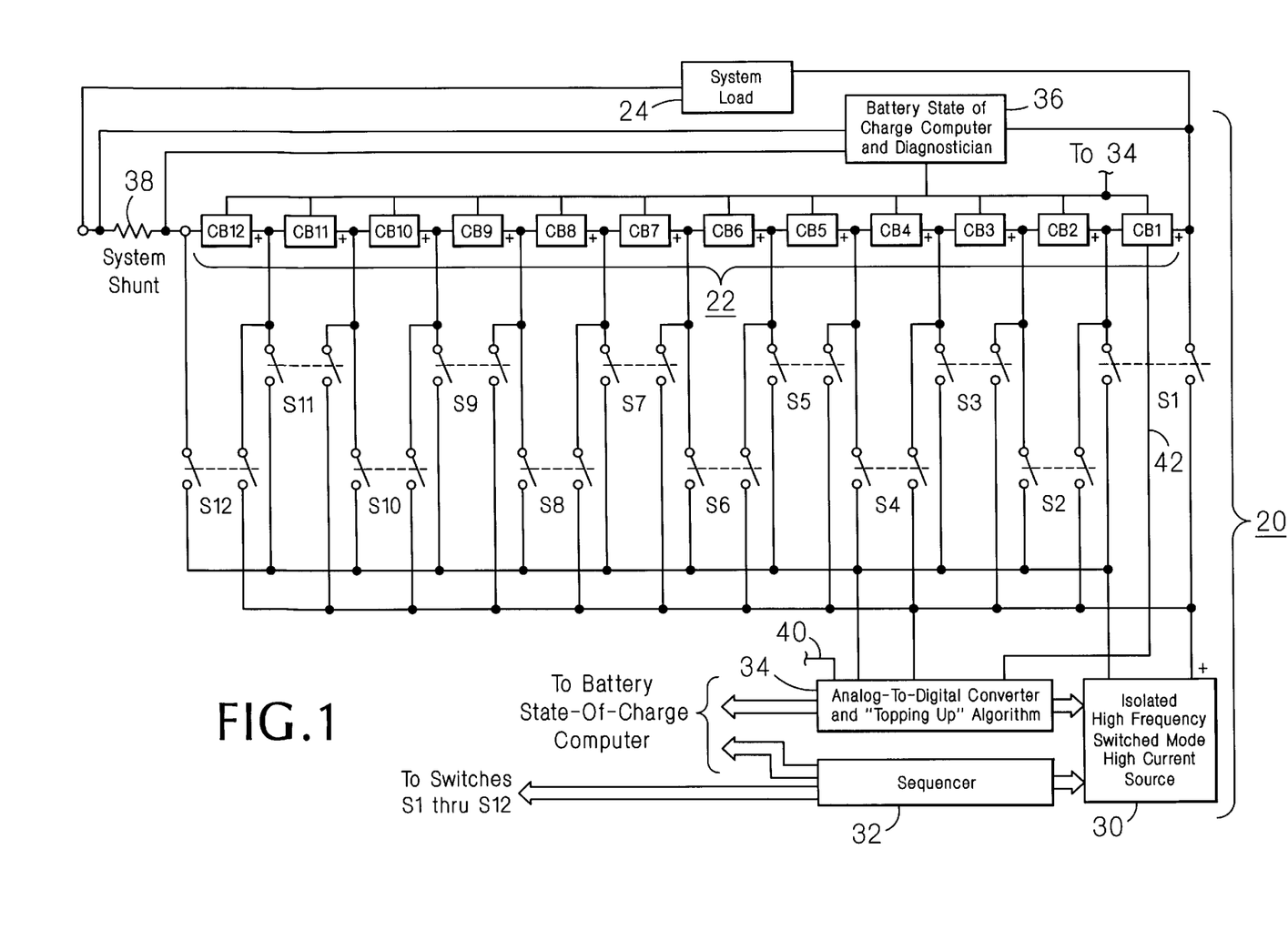
FIG. 1 is a block/schematic diagram showing a battery and battery charging system, the battery being connected to a system load.

FIG. 1 illustrates a battery charging system, constructed according to the present invention, and generally indicated by the reference numeral 20, connected to charge a battery generally indicated by the reference numeral 22, the battery being connected to a system load 24.

Battery 22 includes twelve cell units, CB1 through CB12, which may be individual cells or cell blocks. In the present case, it will be assumed that battery 22 is a 144-volt, 125-amperehour, twelve-cell-block (12×6×2v/cell), system. Charging system 20 includes twelve switch pairs, S1 through S12, each connected to provide charging current to one of cell units CB1 through CB12 from a high current source 30. A sequencer 32 is connected to operate switches S1 through S12 and the sequencer and an analog-to-digital converter and "topping up algorithm" block 34 are connected to high current source 30 and to a battery state-of-charge computer and diagnostician 36. Battery state-of-charge computer and diagnostician 36 is connected to receive a system battery current indication input from across a system shunt 38 connected in series with battery 22 and is also connected via a cable 40 to receive internal temperatures of cell units CB1 through CB12. Cable 40 is also connected to provide temperature inputs to digital-to-analog converter and "topping up" algorithm block 34.

In operation, the general scheme of the present invention is to sequentially charge cell units CB1 through CB12, one at a time, with a charging current that is high compared with that which would be applied to an individual cell during conventional charging of battery 22. The sequence cycle is repeated, as necessary, until battery 22 is fully charged. As is indicated below, the total charging time can be less than the charging time for conventional techniques, while reaping the benefits derived from high-rate charging, although the charging current at any point in the cycle is less than the peak current required for conventional charging. Further benefits will also be described.

Figure 2:
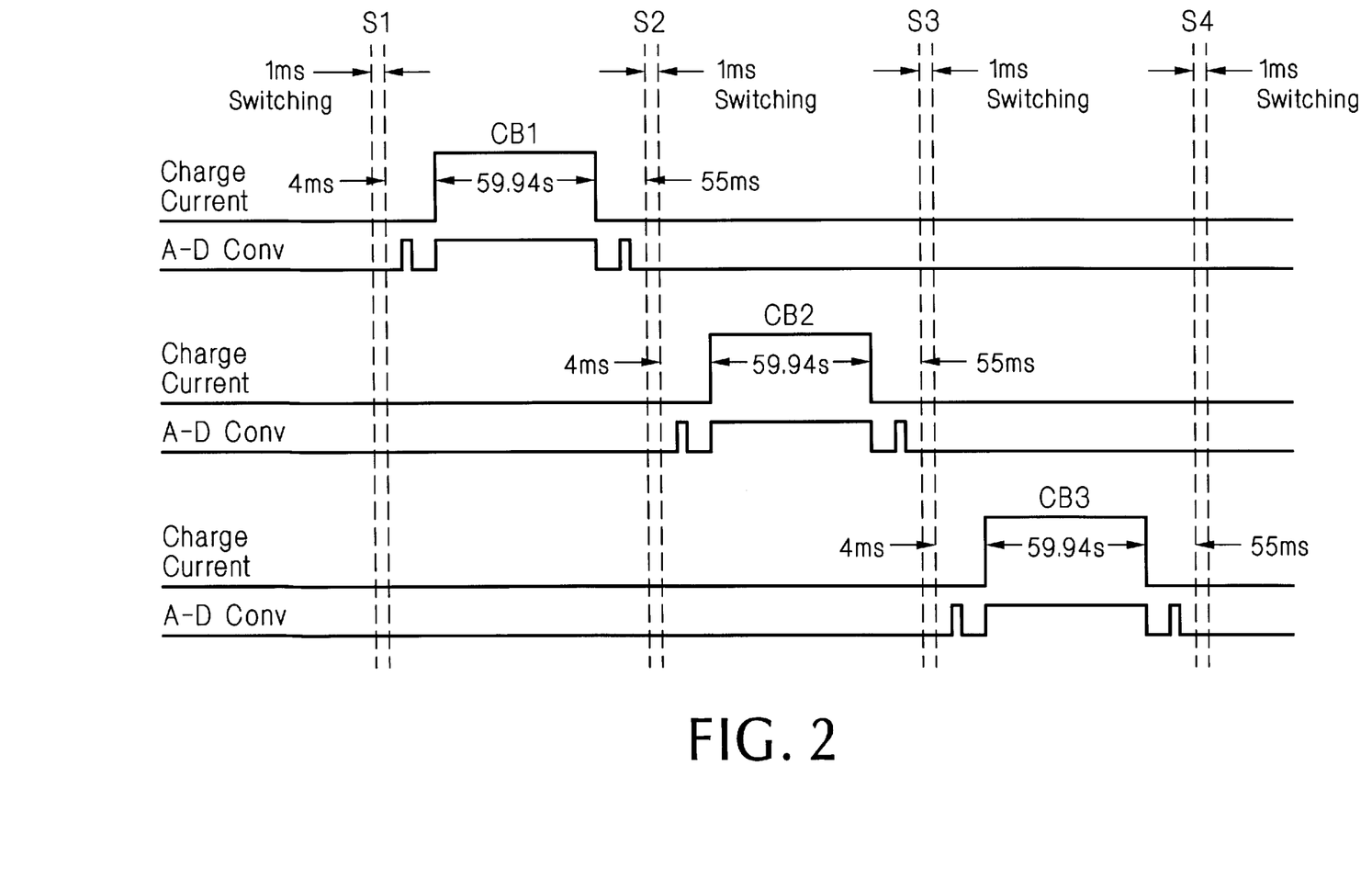
FIG. 2 is a timing diagram for the battery charging system of FIG. 1.

Reference now also to FIG. 2 will aid in understanding the operation of the present invention. FIG. 2 shows an example of a timing cycle for the first three cell units CB1 through CB3 of battery 22 and it will be understood that the timing cycle is identical for the remainder of the cell units of the battery.

In the first 1 millisecond interval, a closing signal is supplied to S1 (FIG. 1) from sequencer 32 to close S1 to connect high current source 30 to cell unit CB1. Four milliseconds later, high current source 30 applies charging current to cell unit CB1.

In the 4 millisecond interval between application of the closing signal to S1 and current flow from high current source 30, analog-to-digital converter 34 measures the condition (open circuit voltage) of cell unit CB1. Charging current is then applied to cell unit CB1 for 59.94 seconds, during which charging interval analog-to-digital converter 34 measures the voltage response of cell unit CB1. After the charging interval, there is a 55 millisecond interval for recovery delay and safeguard delay and for analog-to-digital converter 34 to measure the condition of cell unit CB1. The latter is the first condition measurement of CB1 during the relaxation portion of the cycle for cell unit CB1, the second condition measurement being made just before the next charging interval for that cell unit. The condition of cell unit CB1 could also be measured continuously during the relaxation portion by adding connections between cell units CB1 through CB12 and analog-to-digital converter 34, such as connection 42 between cell unit CB1 and the analog-to-digital converter.

Following the above 55 millisecond interval, a closing signal is supplied to S2 (FIG. 1) from sequencer 32 and the charging of cell unit CB2 is identical to that described above for cell unit CB1. Likewise, cell unit CB3 and the other cell units CB4 through CB 12 are similarly charged sequentially.

Summarizing the timing cycle for a cell unit:

| | | |
|---|---|---|
| Switching | 1 ms | |
| Stabilize | 1 ms | |
| OCV A–D convert | 2 ms | |
| Safeguard delay | 1 ms | |
| | 5 ms | |
| Current on | | 59.94 s* |
| Recovery delay | 52 ms | |
| OCV A–D convert | 2 ms | |
| Safeguard delay | 1 ms | |
| | 55 ms | |

*Closed circuit voltage measured during this interval.

Thus, it is seen that a full round trip charging cycle for the twelve cell units CB1 through CB12 is 12 minutes and that switching and measurement occur in 0.1 percent (60 ms) of a total 60 second charging cycle for a cell unit. Thirty-two such charging cycles are required for a 6.4-hour recharge. Initially, current is flowing for 99.9 percent of the time.

Figure 3:
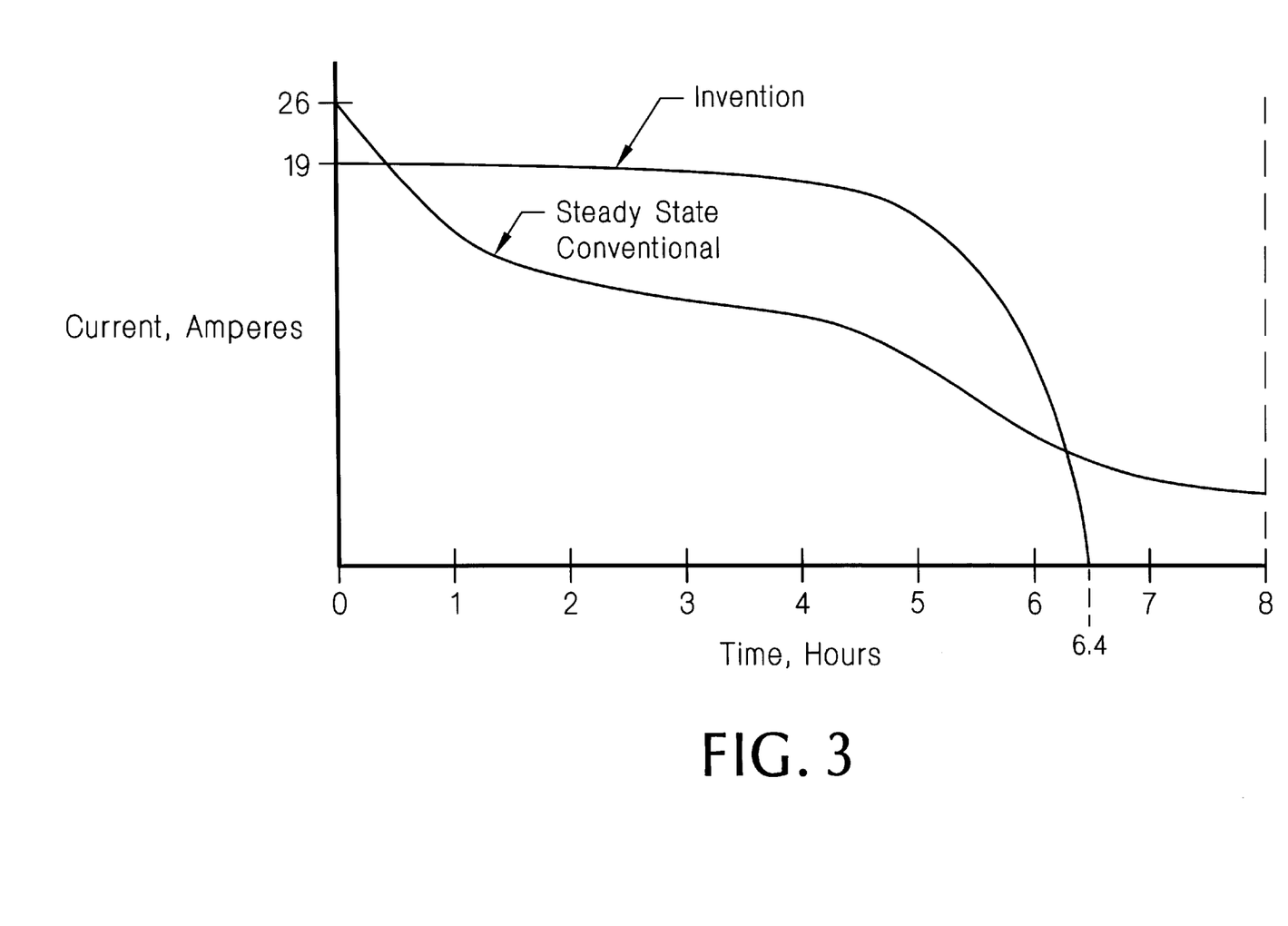
FIG. 3 is a plot of current vs. time for a conventional charging cycle and a charging cycle according to the present invention.

FIG. 3 compares the average current versus time over 6.4- and 8-hour charging intervals for, respectively, the above charging system and a conventional charging system, with the same peak line power requirements.

Total ampere-hours (AH) during charge may be determined as follows:

$$AH = C \times U/E,$$

where,
C = nominal battery capacity,
U = % capacity utilization, and
E = net charge coulombic efficiency.
Thus, for conventional charging:

$$AH = 125 \times 0.80/0.90 = 111.1,$$

and for the above sequential charging:

$$AH=100\times1.00/0.97=103.1,$$

Current "on" intervals are expected to be practical over the range of several seconds to several minutes, but the optimum is expected to be on the order of one-half to three minutes, thus leading to the one minute example of FIG. 2.

It is assumed that switches S1 through S12 are inexpensive, slow solid state switches, although fast switches may be employed instead. Electromechanical switches may be substituted, with the allowance of longer switching times. It can be seen that all high power switching is done under zero current conditions. With only one switch pair active at any one time, the switching array can share drive sources and heat sinks with little or no capacity beyond that required for a single pair.

The technique of the present invention provides extremely high coulombic efficiency by minimizing polarization effects because, using the above example, of the short "on" time (59.94 seconds) and the long "off" time (660.060 seconds). The long relaxation period guarantees that cell units CB1 through CB12 have a long time to chemically and thermally equilibrate and, thus, equalization inherently takes place without further action. The mitigation of polarization provided by the long recovery time as the battery approaches full charge delays the final throttling of current which is inevitably required during "topping up." Such throttling may be in terms of time or current. In the above example, the 59.94 seconds of charging can be considered a maximum, with a shorter period of charging provided during "topping up." The long relaxation period is also long enough that some rather precise calculations can be made to determine the state-of-charge of battery 22 and its health.

Figure 4:
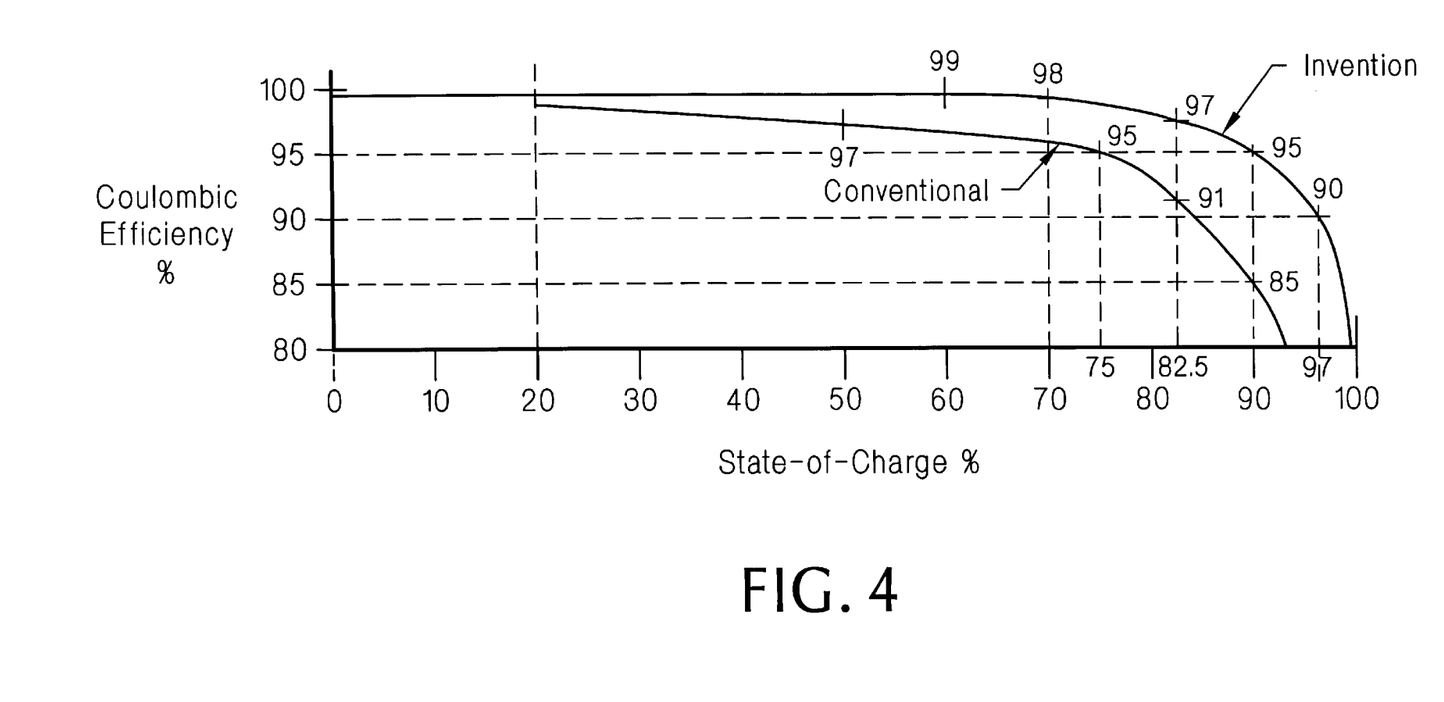
FIG. 4 is a plot of coulombic efficiency vs. percent state-of-charge for a conventional charging cycle and a charging cycle according to the present invention.

It is well known that the coulombic efficiency is inherently high during charge at low states-of-charge, even with conventional low-rate charging techniques. Using the technique of the present invention, the very high efficiency region is: (1) driven lower, (2) is at least as high at normal low states-of-charge, and (3) extends to higher than normal states-of-charge. The recharge coulombic efficiency profiles over, say, an eight-hour charge span could approximate the contours shown on FIG. 4. In summary: the conventional system (assuming 80 percent capacity utilization) provides an overall charge coulombic efficiency of 90.3 percent, while the technique of the present invention (assuming 100 percent capacity utilization) provides an overall charge coulombic efficiency of 97.3%.

The peak sequential charge current is approximately 12 times the average sequential charge current, but the peak sequential charge power is the same as the "peak" steady state conventional charge power.

Details of power equivalencies for the above comparison are as follows:

Conventional starting current=26 A.
Battery voltage at start of charge=150 V.
Power delivered to battery=150×26=3900 W.
Power conversion efficiency=92% for sequential.
Line power=3900/0.92=4239.1 W input power.
Power conversion efficiency of sequential=88%, because of low voltage, high current.
Power delivered to cell block=0.88 (4239.1)=3730.4 W, because of high current.
Cell block voltage later in charging process=2.7(6)=16.2V.
Peak current allowed=3730.4W/16.2V=230.3A.
Average current=0.999(1/12)(230.3)=19.17 A.

While a feature of the present invention is that charging power can be limited to line power inputs equivalent to conventional chargers, such is not a required limitation. For example, the charging time of the above example could be nearly halved to, say, 3½ to 3¾ hours by doubling the peak and average currents. Working the problem in reverse and assuming somewhat lower efficiency and higher cell block voltages yields the following input power (line power):

Average current=19.17(2)=38.34 A.
Peak current=1/0.999(12)(38.34)=460.55 A.
Cell block voltage later in charging process=2.85(6)=17.1 V.
Power delivered to cell block=(460.55)(17.1)=7875.4 W.
Line power=7875.4/0.86=9157.4 W.

Temperature measurement is desirable, both from the aspect of ambient battery temperature and internal temperature rise during the charging process. Electrochemically, the sequential charging technique is very efficient, but $I^2R$ losses will be greater than steady lower current charging. As indicated above, temperature is measured in each cell unit CB1 through CB12. This information is used in a number of ways, as follows:

(1) As an input to the "topping up" algorithm 34 which is refined to examine "on" voltage, "on" dv/dt, "off" voltage, "off" dv/dt, and temperature. This algorithm instructs the high current source to reduce "on" time and/or reduce current amplitude as full charge is approached. The purpose of a minimum of two measurements in both the current "on" and relaxation portions of a cycle is to obtain both absolute value and rate of change information, in order to enhance the precision of state-of-charge estimation and subsequently to provide throttling instructions during "topping up." A particular battery will usually be modeled and tested to provide the basis for current, voltage, and temperature correlation.

(2) As inputs to the battery state-of-charge computer 36 to improve the accuracy of the computation. During charging, battery state-of-charge computer 36 will recharge pessimistically, showing the net battery status as a function of the lagging cell unit. During discharging, a single representative cell unit, or several cell units, or an average of all cell units, can serve as input(s) to the discharge side of the battery state-of-charge computation.

(3) As inputs to the diagnosis portion of state-of-charge computer 36 relative to abnormal temperature and abnormal cell unit-to-cell unit comparisons. Such comparisons are used, for example, to provide alerts concerning abnormalities, especially equalization imbalances. Another abnormality is that one or more of cell units CB1 through CB12 is (are) not throttling back which indicates problems with the cell unit(s).

"Topping up" during throttling may result in a particular cell unit CB1 through CB12 receiving more or less charging current (or time) than others of the cell units. In some case, one or more cell units CB1 through CB12 may receive no additional charging during a charging cycle, depending on voltage information taken immediately before what would otherwise be a period of charging.

Weight savings may also be realized through the use of the sequential charging technique. For example, assuming: (1) 80 percent depth-of-discharge for a conventional system, (2) 100 percent depth-of-discharge for a sequential system, (3) 18 watt-hours per pound for a state-of-the-art lead-acid battery energy density, and (4) a 12-step switching matrix, the weight savings are calculated as follows:

| | | |
|---|---|---|
| Conventional = | 125 AH(144 V) = 18 WH/Pound | 1000 pounds |
| Sequential = | 100 AH(144 V) = 18 WH/Pound | 800 pounds |
| Additional Weight of Matrix = | | 40 pounds |
| Additional Weight of Circuitry = | | 10 pounds |
| Net Savings = | | 150 pounds |

Similar savings in volume can be expected as well.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. A sequential battery charging apparatus for a battery having a plurality of cell units, said apparatus comprising:
   (a) a current source;
   (b) a controller connected to said current source and to each of said plurality of cell units;
   (b) said controller including a sequencer to sequentially remove each of said plurality of cell units from service and to provide current from said current source to said each of said plurality of cell units, while removed from service, for a first selected period of time; and
   (c) level of charging current during a recharging cycle of said plurality of cell units remaining, substantially throughout said recharging cycle, near peak charging current required for a steady-state charging cycle of said plurality of cell units, for charging cycles of substantially equal lengths.

2. A sequential battery charging apparatus, as defined in claim 1, further comprising: means to sequentially remove said current source from said plurality of cell units for a second period of time following said first period of time, said second period of time being substantially greater in length than said first period of time.

3. A sequential battery charging apparatus, as defined in claim 1, further comprising: means to sequentially determine voltage condition of said plurality of cell units during said first period of time.

4. A sequential battery charging apparatus, as defined in claim 1, further comprising: means to sequentially determine voltage condition of said plurality of cell units at least once during said second period of time.

5. A sequential battery charging apparatus, as defined in claim 4, further comprising: means to sequentially determine voltage condition of said plurality of cell units twice during said second period of time to determine rate of change of said voltage condition during said second period of time.

6. A sequential battery charging apparatus, as defined in claim 5, wherein: said means to sequentially determine voltage condition during said second period of time determines said voltage condition near beginning and end of said second period of time.

7. A sequential battery charging apparatus, as defined in claim 1, wherein: total time to charge said battery with said sequential battery charging apparatus is no greater than total time to charge said battery using said steady-state charging cycle for the same degree of charging.

8. A sequential battery charging apparatus, as defined in claim 1, wherein: peak current to charge said battery with said sequential battery charging apparatus in a given period of time is less than peak current to charge said battery using said steady-state charging cycle in said given period of time.

9. A sequential battery charging apparatus, as defined in claim 1, further comprising: abnormality alerting means connected to said plurality of cell units to signal an abnormality in at least one of said plurality of cell units based on voltage measurements of said at least one of said plurality of cell units.

10. A sequential battery charging apparatus, as defined in claim 9, further comprising: means connected to said plurality of cell units to provide temperature inputs to said abnormality alerting means.

11. A sequential battery charging apparatus, as defined in claim 1, wherein: said battery charging apparatus provides greater depth-of-discharge for said battery compared with said steady-state charging cycle for the same degree of charging.

12. A sequential battery charging apparatus, as defined in claim 1, wherein: said battery charging apparatus provides a greater number of discharge cycles for said battery compared with said steady-state battery charging cycle for the same degree of charging.

13. A sequential battery charging apparatus, as defined in claim 1, wherein: said battery charging apparatus provides inherent equalization of said cell units.

14. A sequential battery charging apparatus, as defined in claim 1, wherein: said battery charging apparatus provides greater coulombic efficiency compared with said steady-state charging cycle for the same degree of charging.

15. A method of sequentially charging, with a current source, a battery having a plurality of cell units, said method comprising:
   (a) selectively sequentially connecting each of said plurality of cell units to said current source;
   (b) sequentially providing current from said current source to said each of said plurality of cell units for a first selected period of time; and
   (c) level of current during a recharging cycle of said plurality of cell units remaining, substantially throughout said recharging cycle, near peak charging current required for a steady-state charging cycle of said plurality of cell units for charging cycles of substantially equal lengths.

16. A method, as defined in claim 15, further comprising: sequentially removing said current source from said plurality of cell units for a second period of time following said first period of time, said second period of time being substantially greater in length than said first period of time.

17. A method, as defined in claim 15, further comprising: sequentially determining voltage condition of said plurality of cell units during said first period of time.

18. A method, as defined in claim 16, further comprising: sequentially determining voltage condition of said plurality of cell units at least once during said second period of time.

19. A method, as defined in claim 18, further comprising: sequentially determining voltage condition of said plurality of cell units twice during said second period of time to determine rate of change of said voltage condition during said second period of time.

20. A method, as defined in claim 19, wherein: sequentially determining voltage condition during said second period of time determines said voltage condition near beginning and end of said second period of time.

21. A method, as defined in claim 15, further comprising: charging said battery in a total time no greater than total time to charge said battery using said steady-state charging cycle.

22. A method, as defined in claim 15, further comprising: charging said battery in a given period of time with a peak current less than peak current to charge said battery using said steady-state charging cycle in said given period of time.

23. A method, as defined in claim 15, further comprising: signaling an abnormality in at least one of said plurality of cell units based on voltage measurements of said at least one of said plurality of cell units.

24. A method, as defined in claim 23, further comprising: providing temperature inputs of said cell units to affect signaling said abnormality.

25. A method, as defined in claim 15, wherein: said method provides greater depth-of-discharge for said battery compared with said steady-state charging cycle for the same degree of charging.

26. A method, as defined in claim 1, wherein: said method provides a greater number of discharge cycles for said battery compared with said steady-state charging cycle for the same degree of charging.

27. A method, as defined in claim 1, wherein: said method provides inherent equalization of said cell units.

28. A method, as defined in claim 1, wherein: said method provides greater coulombic efficiency compared with said steady-state charging cycle for the same degree of recharging.

* * * * *

UNITED STATES PATENT AND TRADEMARK OFFICE
CERTIFICATE OF CORRECTION

PATENT NO.   : 6,181,106 B1                                              Page 1 of 1
DATED        : January 30, 2001
INVENTOR(S)  : Eugene P. Finger It is certified that error appears in the above-identified patent and that said Letters Patent is hereby corrected as shown below:

Column 7,
Line 54, the dependency of claim 4 is changed from "claim 1" to -- claim 2 --.

Signed and Sealed this

Twenty-third Day of October, 2001

*Attest:*

*Attesting Officer*

NICHOLAS P. GODICI
*Acting Director of the United States Patent and Trademark Office*